W. A. INGALLS.
RESILIENT WHEEL.
APPLICATION FILED OCT. 7, 1912.
1,144,546.
Patented June 29, 1915.
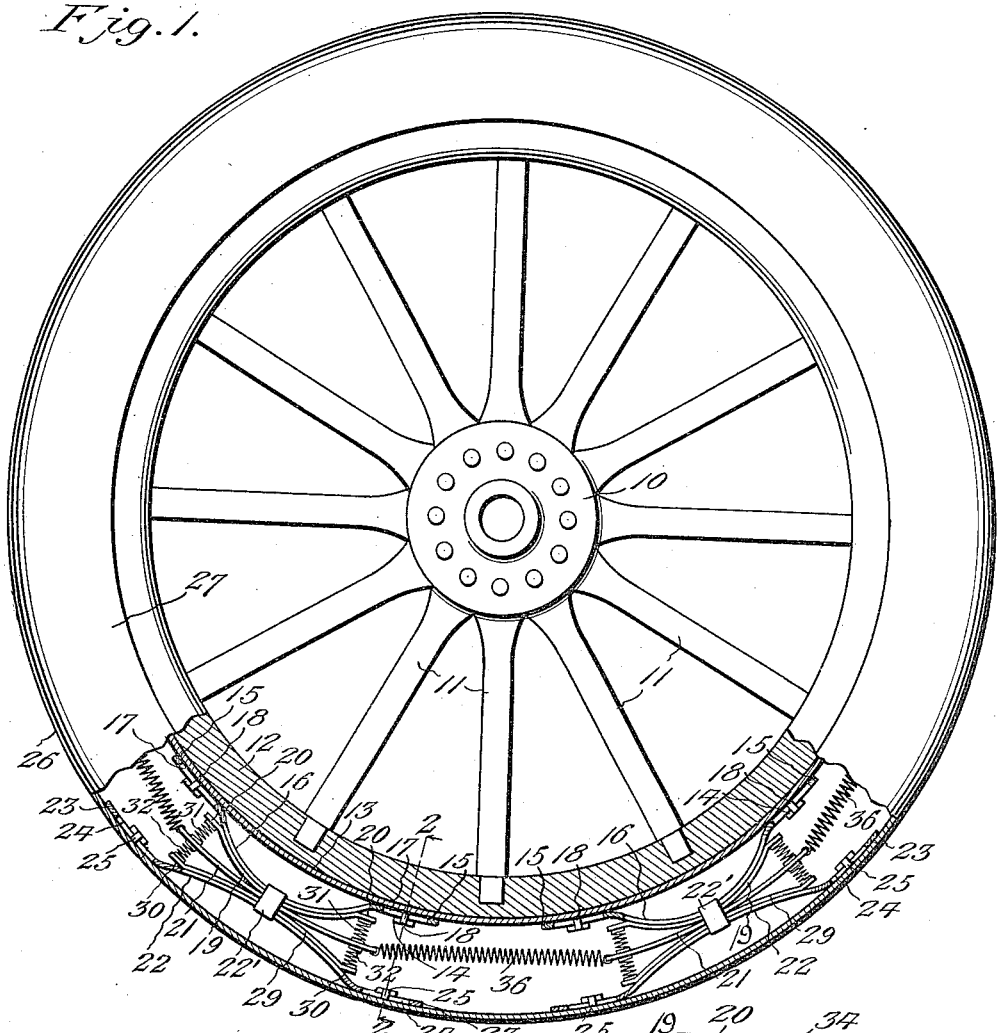
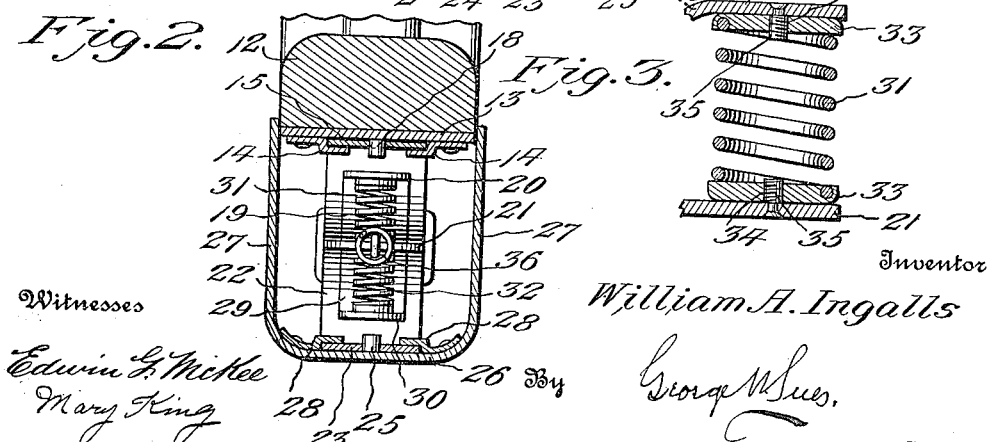
William A. Ingalls

UNITED STATES PATENT OFFICE.

WILLIAM A. INGALLS, OF ARKANSAS CITY, KANSAS.

RESILIENT WHEEL.

1,144,546.  Specification of Letters Patent.  Patented June 29, 1915.

Application filed October 7, 1912. Serial No. 724,427.

*To all whom it may concern:*

Be it known that I, WILLIAM A. INGALLS, a citzen of the United States, residing at Arkansas City, in the county of Cowly and State of Kansas, have invented a new and useful Improvement in Resilient Wheels, of which the following is a specification.

This invention has relation to resilient wheels, and has for its object to provide between an inner rim and an outer casing with which the wheel is provided, spring means of peculiar configuration and arrangement, whereby extreme resiliency is effected between the said casing and the inner rim.

With this object in view, the wheel includes a hub having spokes radiating therefrom which are joined at their outer ends with a rim. The said rim is surrounded by a strip which carries at intervals pins. Leaf springs are arranged in sets, and the members of each set are connected together by a band. The inner springs of each set are provided with slots which receive the pins upon the said strip. Clips are provided upon the strip which slidably receive the end portions of the said inner springs. The outer springs of each set are provided with slots which receive pins carried by a casing, and clips are mounted upon the casing which slidably receive the outer springs. The internal springs of each set of springs are resiliently connected together, and the central leaves of successive sets of springs are connected together by circumferential coil springs which are located within the casing.

For a full understanding of the invention, reference is to be had to the following description and accompanying drawings, wherein:

Figure 1, is a side elevation of the wheel with part thereof in section. Fig. 2 is a transverse sectional view through the rim of the wheel. Fig. 3 shows a detached detail of one of the coil springs.

Similar characters of reference designate corresponding parts throughout the several views.

The wheel comprises a hub 10 to which is attached the inner ends of spokes 11. These spokes radiate from the hub in the usual manner, and a rim 12 is mounted at the outer ends of the spokes 11. A metallic band 13 surrounds the rim 12 and is in close contact with the outer side thereof. Clips 14 are mounted in sets of two at intervals upon the outer surface of the band 13, as best shown in Fig. 2 of the drawing. These clips 14 receive between them the ends 15 of inner bow leaf springs 16. The ends 15 of the said springs are provided with slots 17 which receive pins 18 mounted upon the band 13. The intermediate portions of the leaf springs 16 are curved or bowed outwardly from the center of the wheel, as best shown in Fig. 1 of the drawing. Inner intermediate bow leaf springs 19 are similarly curved at their intermediate portions and are nested upon the intermediate curved portions of the leaf springs 16. The leaf springs 19 are provided with flat outstanding end portions 20 which are spaced from the end portions 15 of the leaf springs 16. Central flat springs 21 are located against the intermediate portions of the springs 19. Outer leaf springs 22 are provided with inwardly curved or bowed intermediate portions, as shown in Fig. 1. The said springs 22 are provided with end portions 23 having slots 24. Pins 25 are mounted upon the intermediate portion of a casing 26 and are located in the slots 24. The casing 26 is provided with side portions 27 which extend inwardly toward the center of the wheel and snugly receive at their inner ends the band 13 and the outer portion of the rim 12. Clips 28 are mounted upon the inner surface of the inner portion of the casing 26 and slidably receive the ends of the leaf spring 22. Outer bow leaf springs 29 fit snugly over the intermediate bowed portions of the springs 22 and are provided with outstanding end portions 30 which are spaced from the end portions 23 of the springs 22. Bands 22′ surround each set of springs of which the leaves 16, 19, 21, 22 and 29 are components.

Coil springs 31 are interposed between the ends 20 of the leaf springs 19 and the end portions of the intermediate leaf springs 21. Coil springs 32 are interposed between the end portions 30 of the leaf springs 29 and the ends of the intermediate springs 21. The said springs 31 and 32 are connected at their ends with plates of similar design, and a description of one set of plates will answer for all. The arrangement of these plates is best illustrated in Fig. 3, in which they are shown attached or connected with the ends of the springs 31. The one end of the spring 31 is connected with a plate 33 which in turn is connected by means of a screw 34 with the end 20 of the leaf spring 19. The screw 34 is provided with a thread 35 which engages a threaded perforation through the plate 33. The other end of the spring 31 is connected with a similar plate which bears against the end portion of the spring 21 and is secured by a similar screw 34 having a thread 35. The ends of the leaf springs 21 throughout the series of leaf springs, are connected together by coil springs 36.

By this arrangement, it will be seen that all of the springs and leaf springs are housed within the casing 26, and that the casing is resiliently supported upon the rim 12 which in turn is rigidly mounted upon the hub of the wheel. By reason of this peculiar arrangement of the springs, the wheel is rendered extremely resilient, for the leaf springs may not only elongate and contract around the periphery of the rim, but the outermost springs may move toward or away from the center of the wheel. This action is controlled more or less by the springs 31, 32 and 36, which tend to preserve a certain amount of rigidity and at the same time lend a certain amount of resiliency to the structure.

Having thus described my invention, what I claim as new is:

1. A wheel comprising a rim, a strip surrounding the rim, clips mounted upon the strip, several sets of leaf springs located about the rim, each set including an innermost leaf spring which is slidably received at its ends within the clips, each innermost leaf spring having at its ends slots, pins mounted upon the strip and which are received within the slots of the said leaf spring, each set of leaf springs including outermost leaf springs which bear against the casing, the outermost leaf springs having at their ends slots, pins carried by the casing which are received by the last-mentioned slots, clips mounted upon the casing and slidably receiving the end portions of the last-mentioned leaf springs, each set of leaf springs including intermediate leaf springs, and coil springs connecting the intermediate leaf springs of adjacent sets of leaf springs together.

2. A wheel including in combination, an inner band, clips mounted upon said band in sets of two, inner bow springs having their ends held between said clips, inner intermediate bow leaf springs having flat outstanding ends secured to said inner springs, a flat central spring secured to each intermediate spring, outer bow leaf springs having flat outstanding ends secured to said central spring, outer bow springs secured to said last mentioned intermediate springs, a casing, clips secured to said casing, the ends of said last mentioned outer bow springs held below said last mentioned clips, a coil spring secured to each outstanding end and held to a central spring, and coil springs connecting the ends of said central springs, as and in the manner set forth.

In testimony whereof I affix my signature, in presence of two witnesses.

WILLIAM A. INGALLS.

Witnesses:
WM. A. ROBERTSON,
C. A. RAWLS.

Copies of this patent may be obtained for five cents each, by addressing the "Commissioner of Patents, Washington, D. C."